June 22, 1926.

W. C. CARLSON ET AL 1,589,681

HOME LOCATION INDICATING MEANS FOR AUTOMOBILE RADIATORS

Filed March 2, 1926.

Inventor
W.C. Carlson,
M.W. Peterson,

By Clarence A O'Brien

Attorney

Patented June 22, 1926.

UNITED STATES PATENT OFFICE.

WILSON C. CARLSON AND MERVIN W. PETERSON, OF ELY, MINNESOTA.

HOME-LOCATION INDICATING MEANS FOR AUTOMOBILE RADIATORS.

Application filed March 2, 1926. Serial No. 91,730.

Our present invention has to do with devices for use on the faces of automobile radiators; and its object is the provision of what we designate home location indicating means, said means when associated with the face of an automobile radiator being calculated to indicate the State of a party on tour and the location of the home town of the party in said State; the relative arrangement of the State simulation and the element indicating the town being sufficient without the use of words or other amplification to impart a generally correct idea of the situation of the town indicating element in the particular State.

Other objects and practical advantages of the invention will be fully understood from the following description and claims when the same are read in connection with the drawings, accompanying and forming part of this specification, in which:—

Similar numerals of reference designate corresponding parts in both views of the drawings.

The automobile radiator 1 is provided with the usual honey comb portion 2 and is otherwise of the ordinary construction.

In accordance with our invention there is arranged against the face of the honey comb portion 2 an open frame 3 which within the purview of our invention may be formed of metal or of any other appropriate material. The said open frame 3 is made in simulation of the geographical outline of a State, the frame illustrated simulating the outline of the State of Minnesota. Any means compatible with the purpose of our invention may be employed in the attachment of the frame 3 to the honey comb portion 2 of the radiator, such for instance, as bolts designated by 3ᵃ and shown by dotted lines in Figure 1.

Manifestly the open frame 3 shaped as illustrated will without seriously detracting from the cooling capacity of the radiator, convey a correct idea of the State of the tourists occupying the automobile.

Figure 1:
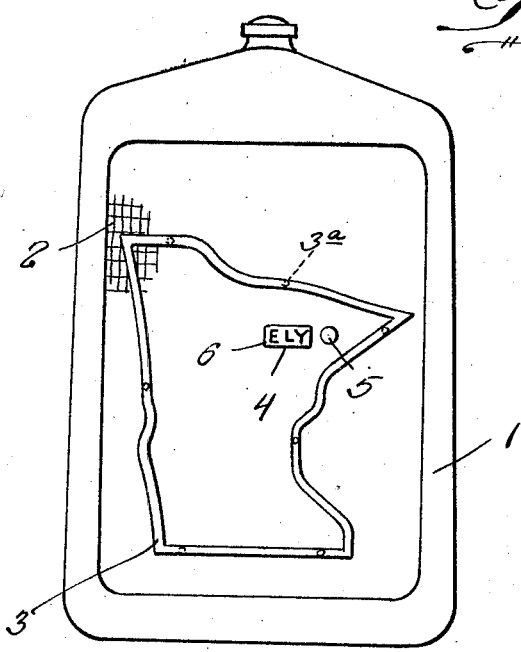
Figure 1 is a front elevation illustrating our improvement as applied to the face of the honey comb portion of an automobile radiator.
Figure 2:
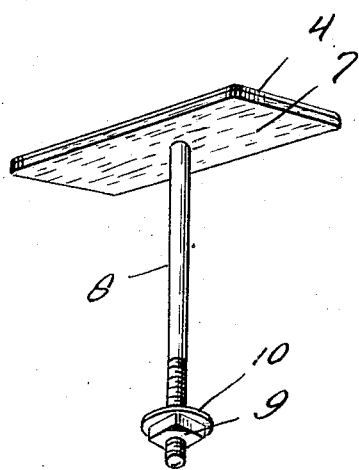
Figure 2 is a perspective showing the plate for carrying the name of the home town and the appurtenances of said plate.

In addition to the open frame 3 which is arranged close against the honey comb portion 2 of the radiator, our improvement comprises a plate 4 and an element 5 preferably, though not necessarily, of disk form. The plate 4, Figures 1 and 2, is preferably of metal and rectangular in form and is designed to bear on its face the name 6 of the home town of the tourists in the automobile. At the inner side of the plate 4 we prefer to employ a layer of felt or other appropriate material, designated by 7, for direct contact with the honey comb portion 2 of the radiator, and it will also be understood from Figure 2 that the plate 4 is equipped with a bolt 8 integral with the plate and adapted to extend through one of the interstices of the honey comb portion 2, and be secured in position by a nut 9 and washer 10 as illustrated so as to hold the plate 4 tight against the honey comb portion 2 and against casual shifting or movement. Manifestly without affecting our invention, any appropriate means other than the bolt 8 and its appurtenances may be employed in the connection of the plate 4 to the radiator portion 2.

The element 5 has for its function to indicate the correct geographical location of the home town of the tourists in the State represented by the open frame 3, and it will be noticed that the name of the home town is arranged in proper relation to the element 5 to convey the information that the name of the home town is Ely, for instance.

The element 5 may be connected to the honey comb portion 2 in the manner before described with reference to the plate 4 or in any other manner compatible with the purpose of our invention.

We would also have it understood that within the purview of our invention the open frame 3 may be formed in one piece or may comprise a plurality of sections properly joined or relatively arranged to simulate the outline of a State, in the discretion of the manufacturer of our improvement.

It will be understood from the foregoing that while we have elected to illustrate the simulation of the State of Minnesota by the open frame 3, the open frame 3 will in each case be of a configuration corresponding to the outline of the State in which is located the home town of the particular tourist who in the automobile is traversing a plurality of States. Manifestly when the automobile radiator is equipped with our improvement, all observant persons will be apprised of the State and the home town of the tourists in the automobile, and the location of the said home town in the particular State, and this without the employment of signs other than the name of the home town on the plate 4, and also without detracting in appreciable measure from the cooling capacity of the radiator.

It will be apparent from the foregoing that the open frame 3 is susceptible of being nickel plated or otherwise embellished, and that when so embellished and applied to the honey comb portion of an automobile radiator, the open frame will enhance rather than detract from the finished appearance of an automobile; and in this connection it will also be appreciated that the plate 4 and the element 5 may be embellished so as to add to the ornamental character of our improvement and at the same time put in contrast the name of the home town and the location of the home town in a particular part of the State represented.

We have specifically described the preferred embodiment of our invention in order to impart an exact understanding of the said embodiment in all of its details. We do not desire, however, to be understood as confining ourselves to the precise construction illustrated and specifically described, our invention being defined by our appended claims within the scope of which modifications may be made without departure from our invention.

Having described our invention, what we claim and desire to secure by Letters Patent, is:—

1. In combination, the radiator of an automobile, having a forward open work or honey comb portion, an open frame arranged against and secured in front of said open work or honey comb portion, said open frame simulating the outline of a particular State comprised in the United States, and an element secured within said open frame and relatively arranged to indicate the part of the State in which the home town of the motorists is located.

2. Means for the purpose described, comprising an open frame shaped to simulate the outline of a particular State of the United States and equipped with means whereby it may be secured against the front of the open work or honey comb portion of an automobile radiator, an element adapted for use within said open frame and equipped with means for the attachment of the element to the open work or honey comb portion of an automobile radiator, and a name plate also adapted for use within the open frame and on the front of the open portion or honey comb portion of an automobile radiator and equipped for attachment to said open work or honey comb portion.

3. Means for the purpose described, comprising an open frame shaped to simulate the outline of a particular State of the United States and equipped with means whereby it may be secured against the front of the open work or honey comb portion of an automobile radiator, an element adapted for use within said open frame and equipped with means for the attachment of the element to the open work or honey comb portion of an automobile radiator, and a name plate also adapted for use within the open frame and on the front of the open portion or honey comb portion of an automobile radiator and equipped for attachment to said open work or honey comb portion; said name plate being provided at its inner or rear side with a pad, and the means for attaching said name plate to the open work portion or honey comb portion of an automobile radiator being in the form of a bolt extending from the inner or rear side of the plate through the said pad and equipped with securing means for attachment at the inner side of the open work or honey comb portion of the radiator.

In testimony whereof we affix our signatures.

WILSON C. CARLSON.
MERVIN W. PETERSON.